Jan. 10, 1967 R. A. BUEKER 3,297,223
FLEXIBLE CONTROL FOR A ROLLER TRANSPORT SYSTEM
Filed Jan. 12, 1965
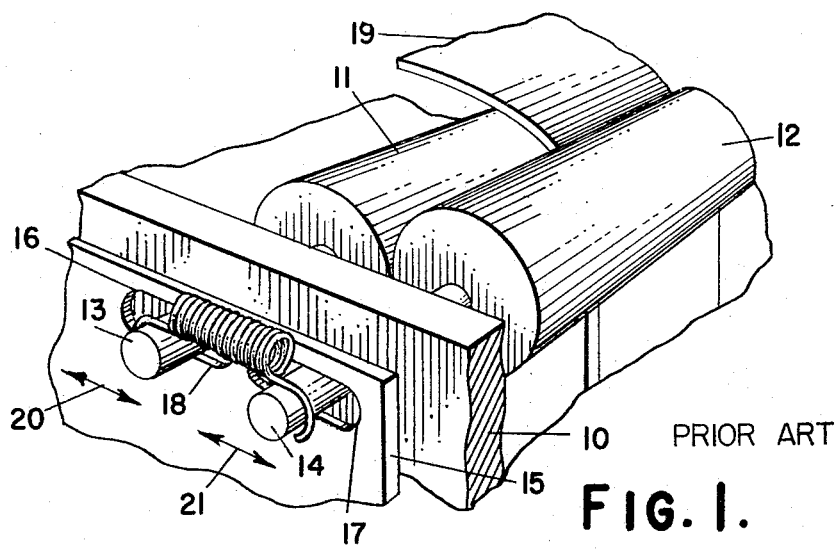
FIG. 1. PRIOR ART
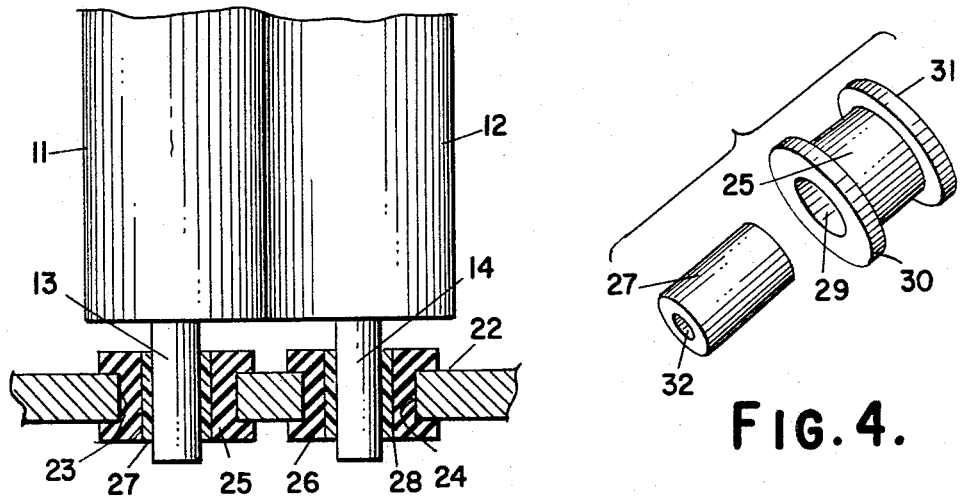
FIG. 2.
FIG. 4.
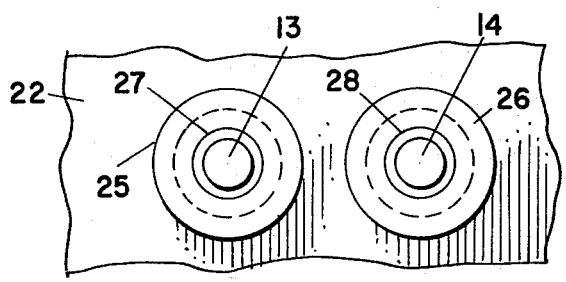
FIG. 3.
INVENTOR.
ROBERT A. BUEKER
BY Elliott & Pastoriza
ATTORNEYS

United States Patent Office 3,297,223
Patented Jan. 10, 1967

---

3,297,223
FLEXIBLE CONTROL FOR A ROLLER TRANSPORT SYSTEM
Robert A. Bueker, Palos Verdes, Calif., assignor, by mesne assignments, to National Research and Chemical Company, Hawthorne, Calif.
Filed Jan. 12, 1965, Ser. No. 424,989
3 Claims. (Cl. 226—183)

This invention relates to an improved flexible control means for use in roller transport systems and more particularly to a flexible control for supporting the end shafts of a pair of transport rollers in parallel tangential relationship to enable accommodation of variations in the thickness of material passed between the rollers.

In many processing systems there are provided pairs of rollers which may function as guide rollers for directing material such as film or paper, or as feed rollers for feeding such material. Generally, the rollers themselves are of resilient material and are disposed in parallel tangential relationship and caused to rotate in opposite directions so as to feed any material passed between the rollers.

In roller transport systems of the foregoing type, end shaft portions of the rollers have required elaborate support systems to permit some variation in the lateral spacing between the end shaft portions when different materials are fed between the rollers themselves. For example, one such prior system includes a guide plate arrangement provided with slots for receiving the roller shafts and a biasing spring biasing the shafts together to apply compression forces between the rollers themselves. The spring arrangement will permit some change to take place in the lateral distance between the rollers should the material being fed through the rollers vary in thickness.

Such systems as have been provided heretofore require adjustment, are relatively expensive to install, and are subject to maintenance requirements.

With the foregoing considerations in mind, it is a primary object of this invention to provide a vastly improved flexible control or resilient type support for shaft end portions of rollers, which overcomes the foregoing difficulties.

More particularly, it is an object to provide a flexible or resilient type support for roller shafts which will accommodate small changes in the lateral distance between the shafts as materials of varying thicknesses are passed between the rollers and yet which may be manufactured and installed relatively economically and require little if any maintenance.

Briefly, these and other objects and advantages of this invention are attained by providing a supporting frame structure having spaced bore openings for receiving respective shaft end portions of parallel tangentially disposed rollers. The bore openings themselves are of considerably larger diameter than the diameter of the shafts and each of these bore openings is provided with a resilient cylindrically shaped member having end flanges. The side walls of the cylindrically shaped member are relatively thick. The shafts themselves pass through these members so that small changes in the lateral distance between the shafts are accommodated by compression of wall portions of the members themselves. There is thus avoided the necessity of complicated spring biasing arrangements and the like for achieving the desired end result of flexible control and support for the rollers.

A better understanding of the invention as well as further features and advantages thereof will be had by now referring to the accompanying drawings, in which:

FIGURE 1 is a fragmentary perspective view of a portion of a roller transport system incorporating a prior art means for supporting the end shaft portions of the rollers;

FIGURE 2 is a plan view partly in cross-section illustrating the improved flexible control for a roller support in accordance with the present invention;

FIGURE 3 is a fragmentary front elevational view of the structure illustrated in FIGURE 2; and, FIGURE 4 is an enlarged exploded perspective view of one of the members providing the desired resilient supporting feature incorporated in the structures illustrated in FIGURES 2 and 3.

Referring first to FIGURE 1 there is shown a frame structure 10 for supporting first and second rollers 11 and 12 disposed in parallel tangential relationship. As shown, the rollers include supporting shafts 13 and 14 which are of smaller diameters than the rollers so that they are laterally spaced in parallel relationship by a distance substantially equal to the sum of the radii of the two rollers.

For mounting the rollers illustrated in FIGURE 1 there is provided a guide plate 15 secured to the frame 10 and provided with horizontal elongated slot openings 16 and 17, registering with an enlarged opening in the frame (not shown) through which the shafts 13 and 14 extend. A biasing spring 18 is coupled between the ends of the shafts to urge these ends towards each other. The distance the shafts can move towards each other is limited by the tangential engagement of the rollers 11 and 12.

With the foregoing arrangement, it will be evident that when material such as film or paper 19 is fed between the rollers 11 and 12, any variations in the thickness of the material tending to separate the rollers would result in lateral motion of the shafts, such as indicated by the arrows 20 and 21. Such lateral motion of the shafts is accommodated by the resiliency of the spring 18 so that damage to the material 19 passing between the rollers will not result.

The foregoing structure illustrated in FIGURE 1 is exemplary of the prior art in this field and is set forth in order that a proper understanding of the environment of the instant improvement will be had.

Referring now to FIGURE 2, there is illustrated the improved flexible control for supporting the rollers 11 and 12. In this respect, the structure of the rollers 11 and 12 and their extending shaft end portions 13 and 14 may be identical so that the same numerals have been employed in FIGURE 2 to designate these portions of the structure.

In accordance with the improved flexible support, there is provided a frame 22 having first and second bore openings 23 and 24 of considerably larger diameter than the diameter of the shafts 13 and 14. In each of these openings there is positioned a resilient cylindrically shaped member indicated at 25 and 26 preferably formed of a rubber material.

Also provided are first and second bearing sleeves 27 and 28 received in the members 25 and 26 to journal the respective first and second shafts 13 and 14.

FIGURE 3 illustrates the appearance of the structure in front elevational view wherein it will be noted that the wall thickness of the cylindrical members 25 and 26 is appreciable as compared to conventional members.

FIGURE 4 illustrates the member 25 in detail with its cooperating bearing sleeve 27. As shown, the cylindrically shaped member 25 includes a central opening 29 for receiving the sleeve 27. The member 25 also includes radially outwardly extending annular end flanges 30 and 31 dimensioned to overlie the periphery of the bore opening 23 as shown in FIGURE 2. By this arrangement, the integral flanges serve to support the member in the bore opening so that no special fastening or tools are required. The sleeve 27 includes a central opening 32 corresponding substantially to the diameter of the shaft 13 for journalling this shaft. The member 26 and sleeve 28 are substantially the same in construction as the member 25 and sleeve 27.

In operation, any changes in the lateral distance between the shaft end portions 13 and 14 will be accommodated by a compression of portions of the cylindrical walls of the members 25 and 26 so that the desired end result achieved by the structure of FIGURE 1 is realized by the improved structure shown in FIGURES 2, 3, and 4.

It will be evident from the foregoing description, accordingly, that the present invention has provided a greatly improved flexible control for properly supporting roller structures in roller transport systems. The resilient members themselves are inexpensive to manufacture, do not require special tools for installation, require substantially no maintenance, and serve to maintain the rollers in a relatively consistent axial relationship and yet accommodate lateral shifting between the shafts as described.

Preferably, the sleeve elements 27 and 28 are formed of nylon to provide a smooth and long lasting bearing surface for the shafts 13 and 14 respectively.

Minor modifications that fall clearly within the scope and spirit of this invention will occur to those skilled in the art. The invention therefore is not to be thought of as exactly limited to the specific example set forth for illustrative purposes.

What is claimed is:

1. A flexible control for a roller transport system including a pair of rollers in parallel tangential relationship having extending shaft end portions, comprising, in combination: a frame having a pair of spaced bores of larger diameter than said shafts; and resilient members of cylindrical shape in said bores having side walls of substantial thickness, each of said members including integral radially outwardly extending annular end flanges overlying the peripheries of said bores so that said members are resiliently supported in said bores, said shaft end portions extending through said members whereby changes in the lateral spacing between said shaft end portions are accommodated by compression of portions of said side walls.

2. A flexible control according to claim 1, including a bearing sleeve received in each of said members for journalling said shaft end portions.

3. A flexible control for a roller transport system including first and second rollers in parallel tangential relationship having first and second parallel roller shafts of smaller diameters than said rollers so as to be laterally spaced apart a center to center distance substantially equal to the sum of the radii of said rollers and adapted respectively to extend through first and second bore openings of greater diameter than said shafts in a supporting frame, said flexible control comprising, in combination: a first member comprised of resilient material formed in the shape of a cylinder having radially outwardly extending annular end flanges dimensioned to overlie the peripheries of said first bore on opposite sides of said supporting frame; and a first bearing sleeve element received within said cylinder for journalling said first shaft; and a second member similar to said first member received in said second bore and including a second bearing sleeve element similar to said first bearing sleeve element for journalling said second shaft, whereby small changes in the lateral spacing between said first and second shafts are accommodated by resilient compression of portions of the walls of the cylinders defining said first and second members.

References Cited by the Examiner

UNITED STATES PATENTS

| | | | |
|---|---|---|---|
| 2,660,380 | 11/1953 | Blackman et al. | 226—183 X |
| 2,725,738 | 12/1955 | Lundy | 100—169 X |
| 2,968,055 | 1/1961 | Linderoth | 308—238 X |
| 3,157,351 | 11/1964 | Sevald | 308—26 X |

M. HENSON WOOD, JR., *Primary Examiner.*

J. N. ERLICH, *Assistant Examiner.*